Patented Sept. 11, 1928.

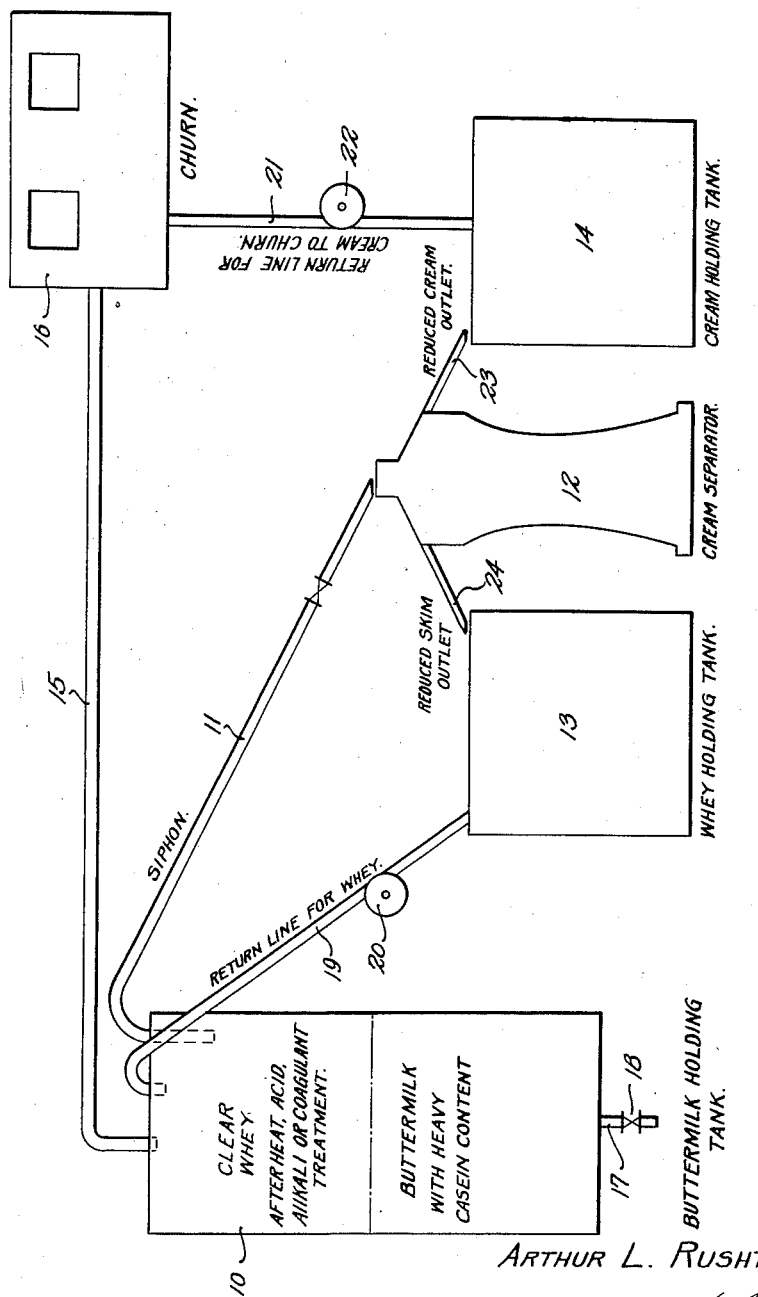

1,683,728

UNITED STATES PATENT OFFICE.

ARTHUR L. RUSHTON, OF OMAHA, NEBRASKA, ASSIGNOR OF ONE-HALF TO MUNSON H. LANE, OF WASHINGTON, DISTRICT OF COLUMBIA.

SEPARATION OF BUTTERFAT FROM BUTTERMILK AND BUTTERMILK WHEY.

Application filed February 16, 1927. Serial No. 168,669.

The invention relates to an improved process for recovering butter or butter fat from buttermilk or buttermilk whey, and consists in passing such buttermilk or buttermilk whey, previously treated, if necessary, to precipitate or dissolve the casein and to partially or wholly dissolve any casein adhering to or surrounding the globules of butterfat, through a centrifugal separator, in which the butter milk is exposed to centrifugal action for a much longer period of time than in the usual separating operation. A creamy substance is obtained by this operation which may be processed to secure butter oil or churned in the usual manner and butter recovered therefrom. This creamy substance may be termed "buttermilk cream" and is in many respects similar to the original cream from which the buttermilk was obtained.

It has been recognized that buttermilk contains butter fat, but the particles are in such fine division and in some cases their specific gravity so increased by reason of adhering and surrounding particles of casein, that it has hitherto been found impossible to effect an efficient separation in the ordinary manner. Moreover, it is known that sour cream buttermilk or the whey from such buttermilk differs from sweet milk, sweet skim milk, sweet or sour cream, and cheese whey in that the particles of casein in suspension are much larger in the butter milk than in the other products, and a large part of the globules of butter fat are to a greater or less extent enmeshed with or enveloped by particles of casein. For this reason, it would be impractical to submit untreated, sour cream buttermilk, to a treatment in an ordinary centrifugal cream separator due to the fact that the separator would become rapidly clogged by the throwing out of casein against its walls and between the disks, if disks are used, of the separator. Therefore, according to my process, when using sour cream buttermilk, it is necessary to submit the buttermilk to a preliminary treatment, to precipitate the casein particles prior to the centrifugal treatment.

It is well known that heat, acid, alkalies, salts enzymes and various other coagulants when applied to milk, skim milk, cream, buttermilk, whey from buttermilk, tend to harden, contract and precipitate the casein particles, and that certain of the above agencies, separately or in combination, will wholly or partially dissolve the casein particles that are present in more or less finely divided suspension in these liquids.

Many different reagents have been tried with success for the purposes above enumerated. Common salt added to lime-neutralized buttermilk has a softening and dissolving tendency, and reduces the objectionable clogging generally caused by the casein, so that it is possible to carry on the centrifugal operation for much longer than in ordinary whole milk separation. Sodium hydroxide may be used for the same purpose on soda-neutralized buttermilk. A considerable range in the amounts of these reagents used is permissible, depending on the amount of butterfat to be extracted, and the length of time the treatment is to be continued.

While both of the above mentioned common reagents give satisfactory results, I have found that $\frac{1}{8}\%$ of tri-sodium phosphate gives particularly good results for a soda or lime-soda neutralized buttermilk, and for a lime-neutralized buttermilk $\frac{1}{4}\%$ of ammonium acetate is desirable. The tri-sodium phosphate has an alkaline reaction, and the ammonium acetate an acid reaction.

These agencies are generally used in the manufacture of casein from skim milk, and for the manufacture of condensed buttermilk from liquid buttermilk, and in other instances of like nature.

I wish to use these agencies to precipitate the larger particles of casein containing only a small precentage of butterfat in sour cream buttermilk or whey from such buttermilk for an entirely different reason, namely, to make a clear whey as free as possible from casein in suspension for the purpose of (a) Putting the whey in a condition that makes possible its passing through a centrifugal separator without frequent clogging due to throwing out of casein in suspension.

(b) Dissolving or softening to some extent the caseous matter surrounding a portion of the minute globules in the buttermilk or whey from buttermilk so that their specific gravity is decreased and so that they have a tendency to rise more rapidly to the surface or upper portions of the whey and respond more rapidly to the action of centrifugal force in a centrifugal separator.

By the use of the above method, the whey from buttermilk is wholly or partially cleared from caseous matter in suspension and the minute fat globules are freed to some extent from any caseous matter adhering to them, thereby making it possible to pass the whey through a centrifugal separator without frequent clogging of the separator.

However, because of the extremely minute size of the fat globules in whey from buttermilk, the percentage of fat separated from whey by passing through a centrifugal separator in the same manner as milk or cream or cheese whey is very small, less than ten per cent being recovered from the cream outlet in the form of a liquid testing 2% or more of fat.

In order to recover a commercially profitable amount of butterfat from buttermilk whey, I have found that if said whey is exposed for a sufficient length of time to centrifugal force that a much larger percentage of butter fat is recovered through the cream outlet, ranging up to 50% of the fat content of the whey in the form of a liquid resembling milk, testing 2% or more of butterfat, as against 3% of the fat in the whey in a 2% or more milk, if run through the separator at the ordinary rate.

The additional exposure of the whey to centrifugal force may be accomplished by (a) The manufacture of a centrifugal separator having much smaller skim milk and cream outlets, or designed to increase in any way the time in which the milk contained in the bowl is exposed to centrifugal force as compared to the time necessary for efficient separation of whole milk.

(b) The adaptation of any already manufactured centrifugal separator by which the skim milk and cream outlets are considerably decreased in size.

(c) The combination of a removable plug to the skim milk and cream outlets of a cream separator so that the capacities of said outlets may be increased or descreased at will.

(d) Intentionally underfeeding the separator, thereby greatly reducing the capacity, i. e. reducing the flow and amount of liquid through the separator by reducing the capacity of the inlet. This is a considerably less successful method, but does lengthen somewhat the time of exposure of the milk to the action of the centrifugal force.

(e) The manufacture of a centrifugal separator of substantially greater size or speed for the purpose of greatly increasing the centrifugal force applied, thereby securing a better percentage of butterfat separation in buttermilk or buttermilk whey.

The feature of my invention which consists in exposing buttermilk for a longer period or to substantially increased centrifugal force, as compared with ordinary cream separating operations is also applicable to obtaining a higher percentage of extraction from sweet cream buttermilk than is obtainable under present practice. In this case not over 60% of the fat in sweet cream buttermilk can be extracted by passing the cream through a centrifugal separator with the same duration of exposure as milk, leaving about 40% unrecovered in the form of minute globules which are too small or of too high specific gravity, probably due to adhering or enveloping casein to respond to the short exposure to centrifugal force, as did the larger globules. By increasing the time during which the smaller globules are exposed to centrifugal force a profitable percentage of these minute fat globules is recovered. If sweet cream buttermilk is employed, the preliminary casein precipitating or dissolving step is not necessary for the reason that the particles of casein in sweet buttermilk are not unduly large or coagulated and do not tend to clog the separator.

The process may be carried out in any suitable apparatus and the accompanying drawings are merely diagrammatic and illustrative of the principles of the invention.

The drawing is a diagrammatic showing of a plant used for extracting butterfat from sour cream buttermilk.

In the drawing the numeral 10 denotes a buttermilk holding tank, 11 a siphon leading from the upper portion of the tank 10 to a centrifugal separator 12, which discharges into a whey holding tank 13, and a cream holding tank 14. The buttermilk holding tank is supplied by means of a pipe 15 from a churn 16, and is also provided with an outlet 17 controlled by a valve 18 for removing the casein which is precipitated therein by means of acid, alkali, heat, or other coagulating agency applied to the buttermilk.

If desired, a return pipe 19 having a pump 20 may be provided for returning whey from the tank to the tank 10, and a pipe 21, having a pump 22 may be employed for returning the "buttermilk cream" to the churn 16. In this manner a continuous operation of the plant may be secured.

The separator 12 may be an ordinary milk separator of any desired type, with the exception of the fact that its outlets 23 and 24 are materially reduced in size from the normal, the openings being scarcely larger than the point of a pin, and should not be larger than one sixty-fourth of an inch in diameter in the case of a disk type centrifugal separator having a rated capacity of 3,500 pounds of milk per hour, or manufactured or adapted in any way to secure a similarly lengthened exposure to centrifugal force.

In the operation, the tank 10 is filled with sour cream buttermilk from the churn 16. Then a suitable coagulating agent, as heat, an acid, an alkali, rennet or other coagulants, is added to precipitate the casein. A separation then takes place and a clear greenish appearing whey separates out at the top of the tank, while a heavy precipitate of casein settles to the bottom. The whey freed of most of its casein content, but carrying with it some fat globules, and these globules carrying only small quantities, if any, of adhering casein matter, are drawn through the siphon 11 to the separator 12. In the separator it undergoes centrifugal treatment for a period of from three to twenty times as long as the usual milk separation. This increased period permits the recovery of a large percentage of the fat from the whey, the percentage increasing with the time of exposure. Beyond a certain point, however, an increase in time does not result in a material increase in butter fat recovered, and I have found that about ten times the usual length of time for ordinary separation produces the most satisfactory results from the standpoint of efficiency.

The following table is given as illustrative of the results obtained with different periods of exposure:—

Table.

Increase in time exposed by means of reduced outlets from three to twenty times that of ordinary exposure for milk, percentage of separation increasing with duration of exposure.

1. Ordinary exposure recovers about 3% total fat in whey, in the form of a liquid obtained from the cream outlet testing 2% total fat or more.

2. 3 x ordinary exposure recovers about 20% total fat in whey in the form of a liquid obtained through the cream outlet, testing 2% total fat or more.

3. 10 x ordinary exposure recovers about 45% total fat in whey in the form of a liquid obtained through the cream outlet, testing 2% total fat or more.

4. 20 x ordinary exposure recovers about 55% total fat in whey in the form of a liquid obtained through the cream outlet, testing 2% total fat or more.

The "buttermilk cream" is delivered to the tank 14 and may be returned to the churns 16 where it is mixed with other cream and churned or it may be churned separately or it may be processed to produce pure butter oil. The butter obtained is of reasonably good quality and scores only a few points under the butter obtainable by the ordinary processes.

Sweet cream buttermilk may be treated in a similar manner, with the omission of the precipitating step in the tank 10.

Sour cream buttermilk may be treated with acids or alkalies to wholly or partially dissolve the casein matter and the resulting solution or finely divided suspension subjected to the action of an ordinary cream separator for a substantially greater period or to substantially greater centrifugal force to produce buttermilk cream from the cream outlet containing a large portion of the butterfat originally contained in the buttermilk.

This process permits operation of the separator without frequent stops for removing the caseous matter thrown out of suspension together with a considerably larger percentage of butterfat, recovered as compared to the separation of untreated sour cream buttermilk with ordinary exposure to the action of a centrifugal cream separator.

I claim:—

A process of separating butterfat from sour cream buttermilk by the use of a centrifugal separator, which consists in first chemically treating the buttermilk with a suitable reagent to materially reduce the clogging tendency of the casein in the buttermilk, then subjecting the treated buttermilk to centrifugal action in a cream separator for a period substantially longer than in ordinary cream separation.

In testimony whereof I affix my signature.

ARTHUR L. RUSHTON.